US008397482B2

(12) United States Patent
Kraemer et al.

(10) Patent No.: US 8,397,482 B2
(45) Date of Patent: Mar. 19, 2013

(54) DRY 3-WAY CATALYTIC REDUCTION OF GAS TURBINE $NO_x$

(75) Inventors: Gilbert Otto Kraemer, Greer, SC (US); Ashok Kumar Anand, Niskayuna, NY (US); James Anthony West, Simpsonville, SC (US); Hasan Ul Karim, Simpsonville, SC (US); Sam David Draper, Simpsonville, SC (US); Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1032 days.

(21) Appl. No.: 12/153,231

(22) Filed: May 15, 2008

(65) Prior Publication Data
US 2009/0284013 A1 Nov. 19, 2009

(51) Int. Cl.
*F02C 7/08* (2006.01)
*F02G 1/00* (2006.01)
*F02G 3/00* (2006.01)

(52) U.S. Cl. ............ 60/39.52; 60/39.5; 60/772; 60/299; 60/280

(58) Field of Classification Search .................. 60/39.5, 60/39.52, 280, 299, 772
See application file for complete search history.

(56) References Cited

U.S. PATENT DOCUMENTS

| 3,792,581 | A | 2/1974 | Handa |
| 3,949,548 | A | 4/1976 | Lockwood, Jr. |
| 3,969,892 | A | 7/1976 | Stettler et al. |
| 4,147,141 | A | 4/1979 | Nagano |
| 5,353,585 | A | 10/1994 | Munk |
| 5,832,712 | A | 11/1998 | Ronning et al. |
| 6,202,400 | B1 | 3/2001 | Utamura et al. |
| 6,598,402 | B2 | 7/2003 | Kataoka et al. |
| 6,910,335 | B2 | 6/2005 | Viteri et al. |
| 6,968,678 | B2 | 11/2005 | LeLeux et al. |
| 7,870,717 | B2 * | 1/2011 | MacKnight .................. 60/39.12 |
| 2006/0248882 | A1 * | 11/2006 | Tonetti et al. .................. 60/295 |
| 2008/0309087 | A1 * | 12/2008 | Evulet et al. .................... 290/52 |

FOREIGN PATENT DOCUMENTS

EP 1429000 6/2004

OTHER PUBLICATIONS

*Technical Review*, vol. 42, No. 3 (Oct. 2005), "Latest Technology for Large-Capacity Gas Turbine".

* cited by examiner

*Primary Examiner* — Phutthiwat Wongwian
*Assistant Examiner* — Craig Kim
(74) *Attorney, Agent, or Firm* — Nixon & Vanderhye, P.C.

(57) ABSTRACT

A power generation system capable of eliminating $NO_x$ components in the exhaust gas by using a 3-way catalyst, comprising a gas compressor to increase the pressure of ambient air fed to the system; a combustor capable of oxidizing a mixture of fuel and compressed air to generate an expanded, high temperature exhaust gas; a gas turbine engine that uses the force of the high temperature gas; an exhaust gas recycle (EGR) stream back to the combustor; a 3-way catalytic reactor downstream of the gas turbine engine outlet which treats the exhaust gas stream to remove substantially all of the $NO_x$ components; a heat recovery steam generator (HRSG); an EGR compressor; and an electrical generator.

15 Claims, 7 Drawing Sheets

DRY 3-WAY CATALYTIC REDUCTION OF GAS TURBINE $NO_x$

FIELD OF THE INVENTION

This invention relates to the reduction and/or abatement of gas emissions from power generation plants, particularly nitrogen-oxide compounds present in the exhaust streams of plants that rely on a gas working fluid to generate electrical power. More particularly, the invention relates to a combined cycle gas turbine power generation system using a gaseous working fluid that has been compressed, combusted and expanded to drive a gas turbine engine, with at least a portion of the exhaust from the gas turbine being recycled to the combustor as an exhaust gas recirculation ("EGR") stream. The invention also relates to a method for treating the exhaust gas using a 3-way catalyst to effectively eliminate selected pollutants (particularly $NO_x$), without adversely effecting the amount of carbon dioxide, carbon monoxide and other constituents in the exhaust stream that may also be separated and treated.

BACKGROUND OF THE INVENTION

In normal operation, combined cycle gas turbine power plants generate significant amounts of oxides of nitrogen ($NO_x$) and $CO_2$ as part of the combustion process. In recent years, the abatement of emissions, particularly $NO_x$, has gained increased attention by the public and federal regulatory authorities, such as U.S. Environmental Protection Agency. Thus, significant resources have been dedicated to reducing and/or eliminating such unwanted emissions. In the burning of a hydrocarbon fuel, particularly liquids, the oxides of nitrogen resulting from air fed to the combustor, as well as nitrogen compounds in the fuel itself (such as pyridine), create pollutants that must be reduced in amount or abated before release to the atmosphere.

Gas turbine engines typically operate on what is known as an "open Brayton cycle" in which air is drawn into a compressor to increase the gas pressure and then combusted with a hydrocarbon fuel, typically natural gas, to produce a high temperature working fluid, with the main products of combustion being carbon dioxide, water (steam), free oxygen and nitrogen, together with undesired products such as carbon monoxide, nitrogen oxides and unburned hydrocarbons. The combustion normally takes place under relatively "lean" conditions, i.e., more than the stoichometric amount of oxygen necessary for complete combustion of the hydrocarbon fuel components in order to maintain the combustion temperature below certain practical limits (which, if too high, would adversely affect the cost and durability of materials of construction).

The high temperature, high pressure working fluid from a combustor is fed into the gas turbine engine where the working fluid expands and the gas temperature drops. In most applications, the gas turbine drives the compressor, as well as a generator that generates electric power. In a simple open Brayton cycle, the working fluid leaves the turbine at a relatively high temperature and thus can be used to generate steam in a heat recovery steam generator ("HRSG") before being exhausted or treated in downstream operations such as for $NO_x$ reduction by selective catalytic reduction ("SCR"). The steam created by the heat recovery steam generator can be used as part of a combined cycle plant to drive a steam turbine such as that found in most closed Rankine cycle steam power plants, thereby increasing the power generation efficiency of the entire plant.

One significant deficiency of open Brayton cycle and combined cycle gas turbine systems is that the exhaust gas includes various oxides of nitrogen ($NO_x$) and a significant amount of carbon dioxide ($CO_2$) and carbon monoxide (CO), all of which are now under increasing public scrutiny for possible adverse environmental effects. Thus, various efforts have been made in the past to lower the amount of $NO_x$ generated by gas turbine systems before the $NO_x$ must be separated and treated. For example, the nominal level of $NO_x$ can be reduced by using the exhaust gas from a preliminary combustor (which contains less oxygen and free nitrogen) as the primary source of oxygen available for combustion. See, e.g., U.S. Pat. Nos. 3,792,581 and 4,147,141. Stettler U.S. Pat. No. 3,969,892 similarly discloses a gas turbine system in which a portion of the exhaust gas from the burner is recycled through a heat exchanger and then back into the combustor with a resulting reduction in nitrogen oxide in the exhaust. Lockwood U.S. Pat. No. 3,949,548 discusses an exhaust gas recirculation system in which a portion of the exhaust gas is cooled and recirculated through a compressor, again with a slight expected reduction in nitrogen oxide.

Despite these developments in reducing the amount of $NO_x$ constituents present in gas turbine exhaust streams, the need remains for a more efficient and cost-effective method and apparatus for treating the emissions of nitrogen oxides, $CO_2$ and other pollutants, even assuming that their levels in the turbine exhaust can be reduced slightly by conventional means. Past methods of $NO_x$ removal in gas turbine systems typically involved one or more of the following processes: SCR, selective noncatalytic reduction, catalytic decomposition or absorption.

SCR processes rely on the selective reduction of NOx using ammonia, with the basic reactions expressed as:

$$4NH_3 + 2NO + 2O_2 \rightarrow 3N_2 + 6H_2O; \text{ and}$$

$$4NH_3 + 2NO_2 + O_2 \rightarrow 3N_2 + 6H_2O.$$

With SCR, the oxides of nitrogen created during combustion can be reduced to acceptable EPA levels. However, such processes suffer from known deficiencies, including the possible formation of other nitrogen-based compounds that require further treatment before being released into the atmosphere. An exhaust stream can be "scrubbed" using processes that convert the $NO_x$ to free nitrogen, or that physically separate the $NO_x$ from the exhaust. However, such operations tend to decrease the overall efficiency of the gas turbine and fail to initially remove sufficient amounts of $NO_x$ from the exhaust stream. Many SCR systems also require heating to maintain a controlled reduction temperature and have a potential for emitting ammonium sulfate.

Prior art selective noncatalytic reduction processes operate without any catalyst to convert the $NO_x$ through a reaction with ammonia to nitrogen and water as follows:

$$4NH_3 + 4NO + O_2 \rightarrow 4N_2 + 6H_2O.$$

Unfortunately, non-catalytic systems tend to be limited by a narrow reaction temperature range and the fact that process temperatures can change with varying gas turbine engine loads. In addition, the process reduces only 60 to 80 percent of the $NO_x$ while requiring a large molar volume of $NH_3$.

Catalytic decomposition systems, in addition to being expensive and complex, likewise tend to remove only about 70 percent of the $NO_x$, depending on the effectiveness of the catalyst. A typical decomposition reaction is shown below:

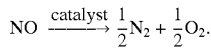

$$NO \xrightarrow{catalyst} \frac{1}{2}N_2 + \frac{1}{2}O_2.$$

Most absorption processes remove $SO_x$ and $NO_x$ using an activated char compound. The process is complex, has an $NO_x$ removal potential of only about 40 to 60 percent, and requires handling hot solids.

Thus, the existing processes for removing $NO_x$ in exhaust streams of gas turbine engines have well-known deficiencies in both cost and effectiveness.

Another major concern in the design and operation of gas turbine power plants is the isolation and efficient removal of carbon dioxide and carbon monoxide. As noted above, large quantities of $CO_2$ are normally produced in combined cycle systems as one of the major products of combustion of natural gas with air. Removing $CO_2$ requires that it first be separated from nitrogen and other gaseous constituents of the working fluid (e.g., by chemical reaction and/or physical absorption). While $CO_2$ sequestration techniques are well-known, significant energy is utilized in separating the $CO_2$ from other constituents such as $NO_x$, and hence the efficiency of the power generation system decreases when such $CO_2$ separation is required. The $CO_2$ can be captured by direct contact between the exhaust gas and an absorbent such as mono-ethanolamine (MEA). However, MEA separation processes can result in significant penalties to the overall efficiency of the plant. State-of-the art amine separation systems invariably have high operational and capital costs, depending on the presence of other compounds in the exhaust stream and the concentration of the $CO_2$ in the flue gas volume.

In recent years, Exhaust Gas Recirculation (EGR) has become a useful technology for increasing the $CO_2$ concentration of the exhaust gas from gas turbine engines, making it easier to isolate the $CO_2$ present in the flue gas. On the other hand, the use of EGR requires a careful balancing of process conditions in order to avoid an increase of other emissions that are environmentally prohibited (including $NO_x$) that can be produced in a low-oxygen environment due to incomplete combustion. EGR levels well below 40% are typically recommended due to the low levels of oxygen present in the combustor. Otherwise, unwanted CO can be produced due to incomplete oxidation to $CO_2$ in rich flames. Similarly, at least some dissociation of $CO_2$ to CO or $NO_2$ to NO can occur in both stoichiometric and "lean" fuel combustions, depending on the specific combustion and EGR conditions involved.

BRIEF DESCRIPTION OF THE INVENTION

It has now been found that a number of significant benefits can be achieved using EGR under the process conditions described below. In particular, a reduction in the amount of $NO_x$ in the exhaust gas can be achieved at higher levels of EGR, while at the same time increasing the $CO_2$ concentration and significantly reducing the amount of oxygen remaining in the exhaust gas stream, i.e., to levels at or below 4%. Even more significant, under the EGR conditions described below, it has been discovered that the exhaust gas stream can be treated in a much more economical and efficient manner, namely by using a dry 3-way catalyst to remove the $NO_x$.

Recent studies by General Electric indicate that under carefully controlled process conditions a $NO_x$ reduction of up to 50% using high levels of EGR are now possible. For example, EGR levels of up to 35% and 40% can be used without significantly increasing the amount of unwanted exhaust constituents (such as CO or NO). It has also been found that gas turbine combustors can operate at high fuel efficiencies and still reduce the amount of $NO_x$ using a high percentage EGR, while maintaining an acceptable (even increased) level of $CO_2$, again without any significant increase in CO or NO formation.

Of equal importance, the use of EGR under the controlled process conditions described herein reduces the amount of free oxygen remaining in the exhaust gas down to 4% or less by volume. That is, an exemplary process using EGR results in unusually low threshold amounts of oxygen remaining in the exhaust gas (even approaching 0%), while at the same time reducing the $NO_x$ concentration and increasing the $CO_2$ level. For the first time, the low amount of oxygen present in the recycle has made it possible to use a dry 3-way catalyst to remove the $NO_x$ in the final exhaust gas stream leaving the plant.

DETAILED DESCRIPTION OF THE INVENTION

An exemplary embodiment of the power generation system according to the invention includes the following basic components: A gas compressor that increases the pressure of ambient air fed to the system; a combustor capable of combusting a mixture of fuel (such as a hydrocarbon or syngas) and compressed ambient air to generate a high temperature exhaust gas stream; a conventional gas turbine engine downstream of the combustor with turbine blades moveable by the force of the expanded, high temperature exhaust gas; a high percentage EGR stream fed to the combustor; a 3-way catalytic reactor downstream of the gas turbine engine that contacts an exhaust gas stream having less than 4% by volume oxygen and removes a substantial amount of the $NO_x$ components (typically about 70%); a heat recovery steam generator (HRSG); a cooler (heat exchanger) to lower the temperature of a portion of the exhaust gas leaving the HRSG to form a cooled EGR stream; an EGR compressor that increases the pressure of the cooled EGR; and an electrical generator coupled to the gas turbine engine to generate electricity. The 3-way catalyst may reside at any location downstream of the combustor where the oxygen content remains below about 4% and the gas temperature ensures an acceptable level of catalyst efficiency and durability.

In the above exemplary power generation system, it has been found that using high levels of EGR (over 35% by volume) at higher than normal combustor flame temperatures increases the nominal amount of $CO_2$ in the exhaust stream leaving the plant. In like manner, the use of 40% EGR at higher than normal flame temperatures will result in a 10% $CO_2$ level in the exhaust gas.

The use of high percentage EGR thus has a number of significant benefits. $NO_x$ emissions can be reduced while the amount of $CO_2$ is increased (thereby significantly reducing the difficulty and cost to isolate and separate the $CO_2$ using conventional means). In addition, the amount of oxygen can be reduced to less than 4%, making the exhaust stream treatable in a way not heretofore known in the gas turbine art, namely contacting the exhaust stream with a dry 3-way catalyst to reduce and/or eliminate the $NO_x$.

In a further embodiment of the invention, it has been found that potential unwanted partial combustion products, such as NO and CO, can be further reduced in volume by recirculating a portion of the combustion gases back into the combustion chamber itself. This "hot" EGR embodiment tends to lower the amount of CO and unburned hydrocarbons present in the exhaust gases leaving the combustion chamber, in addition to causing a slight further reduction in the amount of residual oxygen in the gas ultimately treated using a 3-way catalyst.

Figure 1:
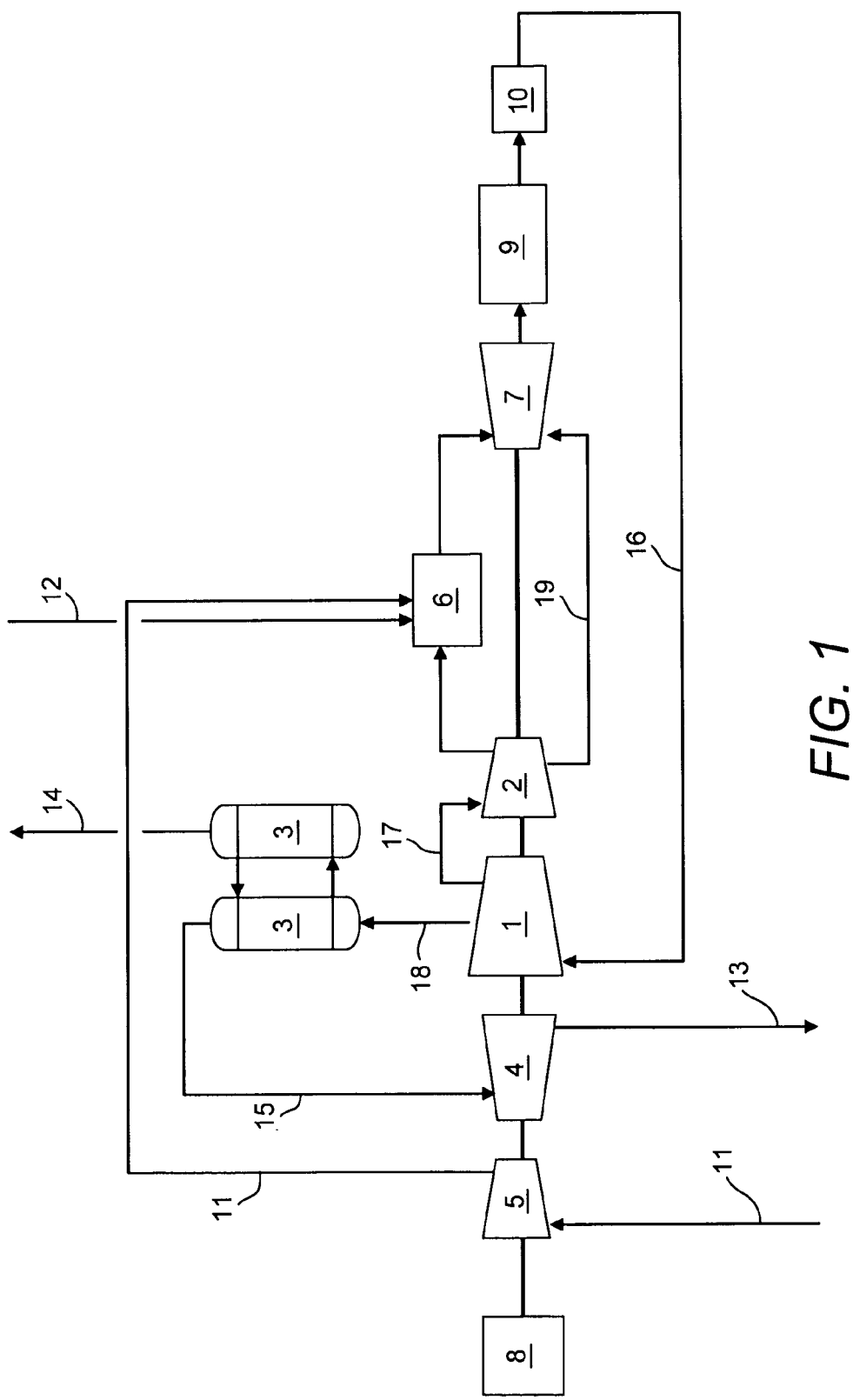
FIG. 1 is a block flow diagram depicting a conventional plant layout using EGR, including the exemplary major pieces of equipment necessary to carry out an EGR process.

FIG. 1 is a block flow diagram depicting a general plant layout using EGR (but without a 3-way catalyst), including the exemplary equipment normally used to carry out an EGR process. As FIG. 1 indicates, fuel 12 and a compressed air stream 11 from compressor 5 are combined and burned in combustor 6 to generate a high temperature exhaust gas stream that serves as the primary working fluid to drive turbine 7. The exhaust gas leaving turbine 7 (still at a relatively high temperature) passes through heat recovery steam generator (HRSG) 9 and an exhaust gas cooling unit 10, and then back into EGR compressor 1 as exhaust gas recycle 16 containing unburned hydrocarbon fuel, CO, $CO_2$, $NO_x$, NO, free oxygen and nitrogen, as well as other minor pollutants.

EGR compressor 1 increases the pressure of exhaust gas recycle 16 and then separates the compressed EGR into two fractions as discharge from different compressor stages, namely stream 17 (approximately 60% by volume) which is fed to compressor 2 before being returned to combustor 6. A second portion of the compressed gas stream from compressor 2 serves as part of the working fluid for turbine 7 (see line 19). Compressed stream 18 from EGR compressor 1 (approximately 40% by volume) passes into carbon dioxide separators 3, with the separated $CO_2$ shown leaving the system for further treatment at 14. The non-$CO_2$ components in stream 15 from separators 3 serve as an additional working fluid to drive turbine 4, which is operatively coupled to compressor 5 and electrical generator 8 to generate electricity. The exhaust gas from turbine 4 (now relatively free of $CO_2$) is discharged from the system through line 13, nominally to a smoke stack or downstream environmental pollution control system.

Figure 2:
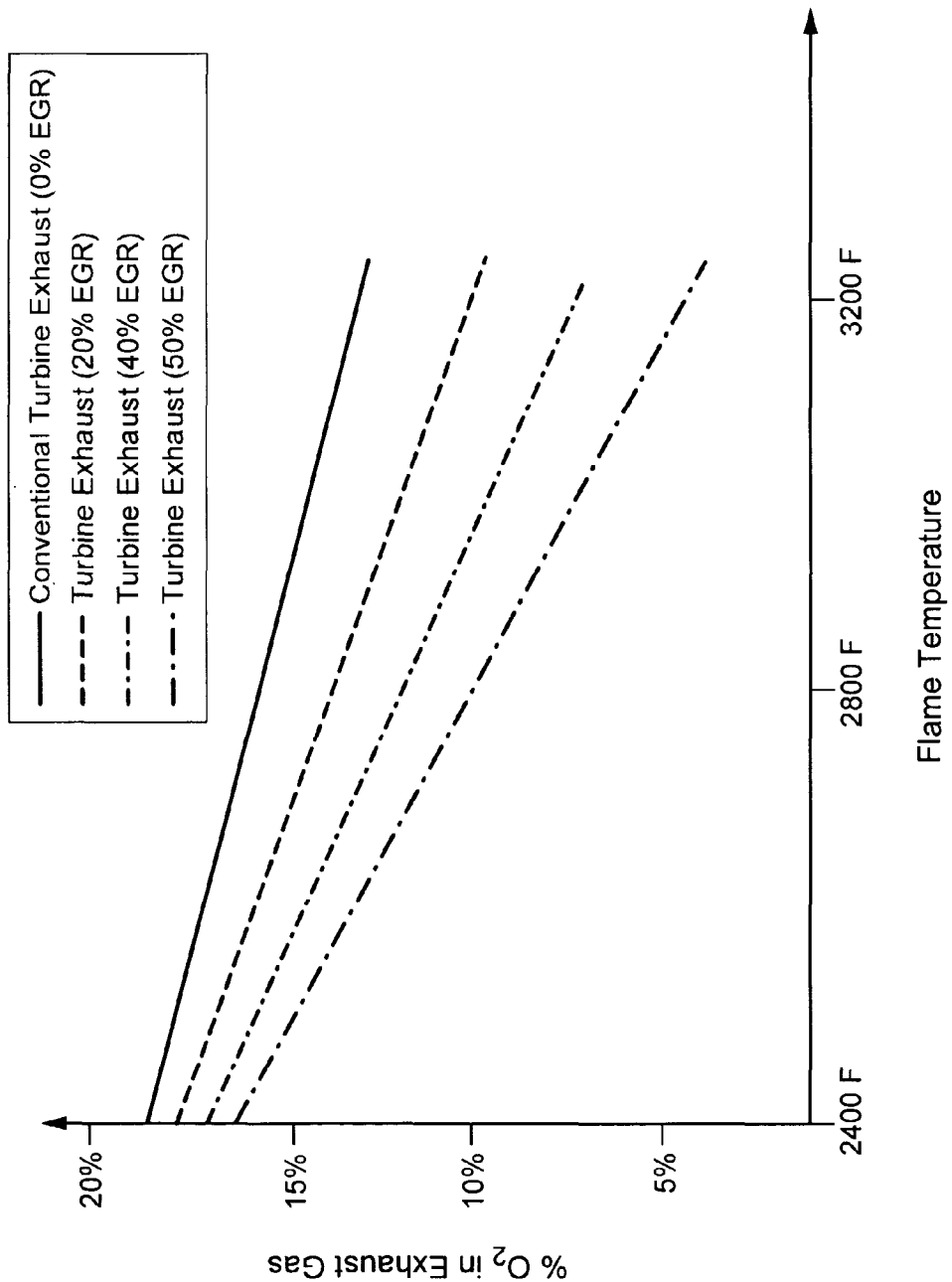
FIG. 2 is graphical representation in the form of a family of curves depicting the oxygen concentration in the turbine exhaust for different flame temperatures in the combustor, with the amount of oxygen in the exhaust gas being compared at various percentage levels of EGR (20, 40 and 50%), with 0% representing the turbine exhaust of a conventional system without any EGR.

FIG. 2 is graphical representation of the oxygen concentration in the turbine exhaust at different flame temperatures in the combustor (sometimes known as the "gas turbine firing temperature"), with the amount of oxygen in the exhaust being compared at various percentage levels of EGR (20, 40 and 50%), with 0% representing the exhaust of a conventional system without any EGR. As FIG. 2 illustrates, using EGR in the above exemplary embodiments tends to significantly reduce the level of free oxygen in the exhaust gas, while increasing the amount of carbon dioxide, and without increasing the amount of CO or $NO_x$. Thus, the oxygen content in the exhaust gas at higher EGR levels can be reduced to 4% or less (preferably close to 0%), making it possible to remove the $NO_x$ components using a dry 3-way catalyst.

FIG. 2 thus illustrates the anticipated difference between the amount of residual oxygen remaining in an exhaust gas stream at various percentages of EGR, i.e., showing that the oxygen level drops significantly at higher percentages of EGR. Although each of the systems depicted in FIG. 2 tends to reduce the oxygen in the exhaust gas at higher combustor flame temperatures, the use of EGR in accordance with the invention consistently achieves a much lower oxygen level as compared to a conventional turbine exhaust without EGR.

Figure 3:
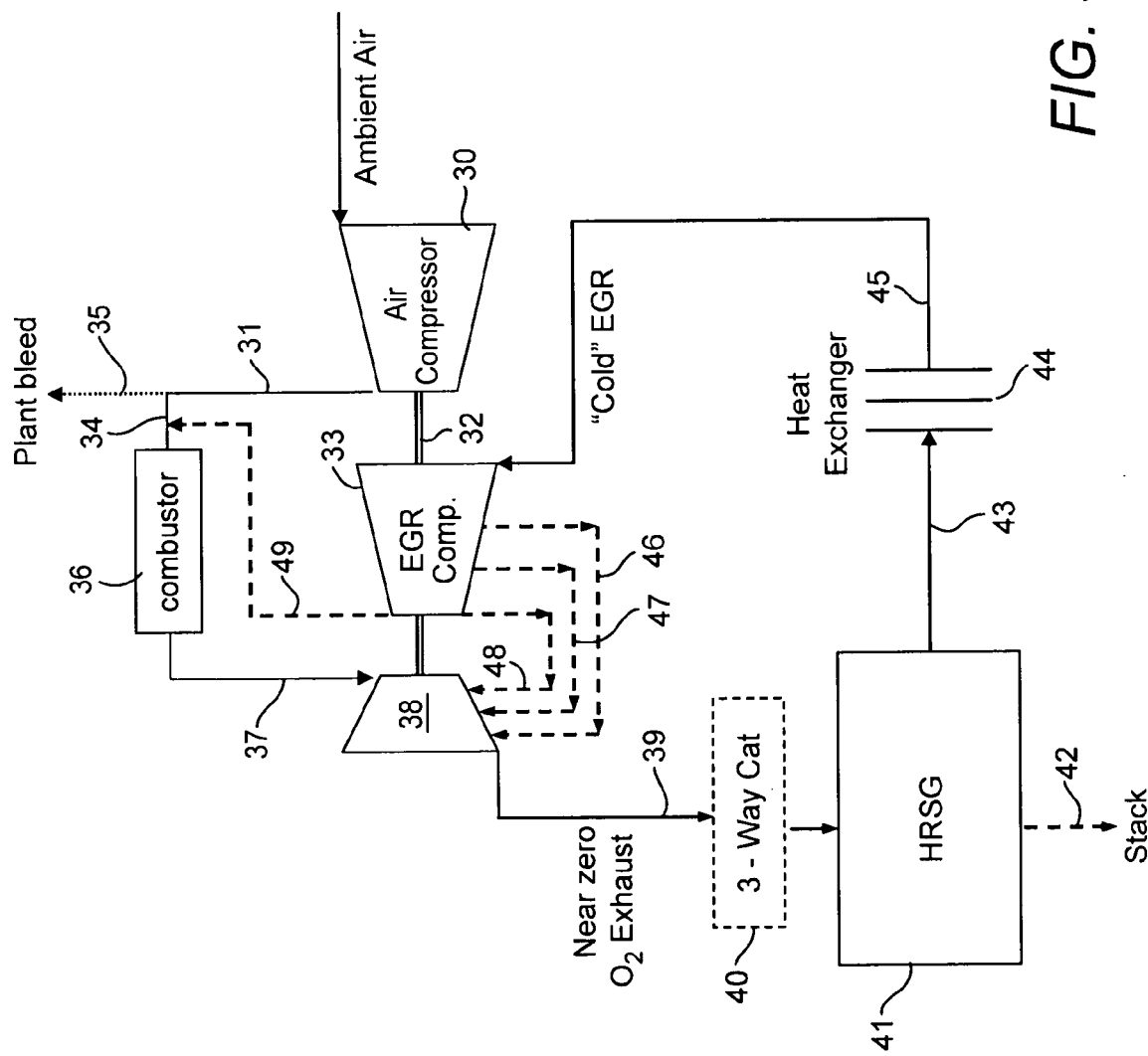
FIG. 3 is a process flow diagram showing the basic steps and equipment used to carry out the EGR and 3-way catalyst treatment according to the invention, including exemplary steps to achieve the desired low level of oxygen in the exhaust gas and removal of $NO_x$ components.

FIG. 3 is a process flow diagram showing the basic process steps and equipment used to carry out the EGR and 3-way catalyst treatment, including the equipment and steps to achieve the desired low level of oxygen in the exhaust gas. The 3-way catalyst module may contain an oxidation catalyst before the 3-way catalyst to reduce the oxygen content to the desired level and an oxidation catalyst after the 3-way catalyst to reduce hydrocarbon partial oxidation products to the desired concentration. FIG. 3 shows that ambient air enters compressor 30 and passes at a significantly higher pressure (and slightly increased temperature) into combustor 36 through feed line 34. As noted above in connection with FIG. 1, combustor 36 combines a hydrocarbon fuel component with air to generate a high temperature exhaust gas stream 37 that serves as the main working fluid for turbine 38. Turbine 38 in turn drives EGR compressor 33 and compressor 30 as shown. "Cool" EGR enters the EGR compressor via line 45 and exits at a significantly higher pressure as a compressed recycle stream. Meanwhile, the exhaust gases from turbine 38 (which have less than 4% by volume oxygen present) pass through a 3-way catalyst reactor 40 via line 39 that removes the $NO_x$ components.

Under certain operating conditions depending on the temperature at different points inside the gas turbine, it may be desirable to position the 3-way catalyst inside the turbine itself, rather than utilize a separate downstream catalytic reactor. In addition, different catalysts could be employed to remove $NO_x$ at other locations downstream of the combustor (including even the HRSG), depending on the precise operating regime in which the catalysts perform at acceptable levels. That is, three-way catalysts according to the invention can be positioned at various locations in the process, provided the location is downstream of the combustor, the oxygen level remains low enough to allow the catalysts to efficiently remove $NO_x$ contaminants, and the process conditions do not adversely effect overall catalyst performance.

FIG. 3 shows that the treated hot exhaust gas stream 39 passes through heat recovery stream generator (HRSG) 41. A substantial fraction of the recycle at 43 is then cooled using heat exchanger 44 and the cooled EGR stream 45 is returned to EGR compressor 33 as indicated above. FIG. 3 also illustrates that it may be beneficial to use certain portions of the EGR stream to help drive and provide auxiliary flows to turbine 38 (thereby improving the overall efficiency of the plant with the goal of achieving the required exhaust oxygen content) as shown by discharge lines 46, 47 and 48 taken from different stages of EGR compressor 33.

Figure 4:
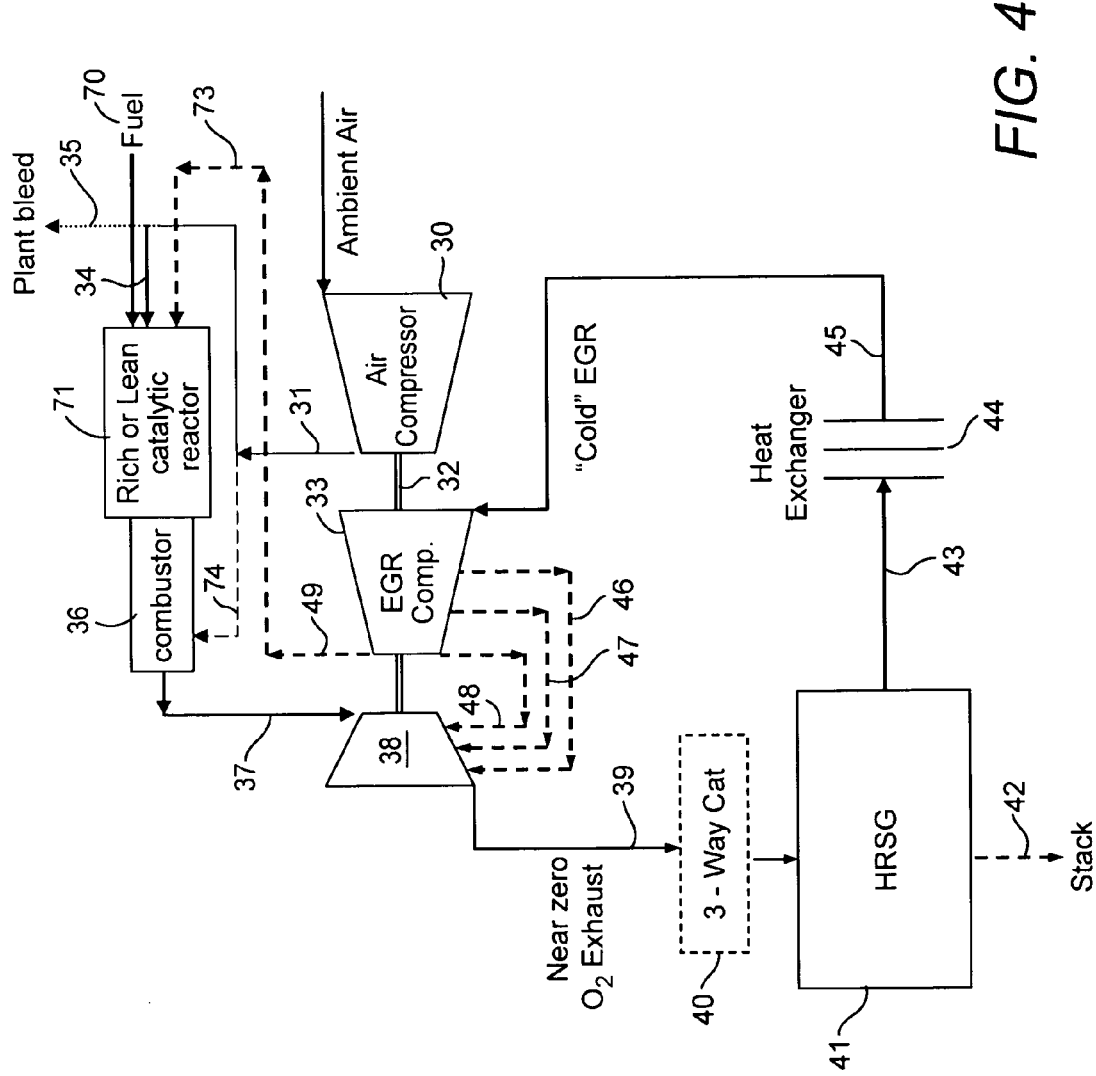
FIG. 4 is a process flow diagram for an alternative embodiment of the invention depicted in FIG. 2 that includes certain modifications to the inlet feeds to the combustor.

FIG. 4 is a process flow diagram for an alternative embodiment of the invention depicted in FIG. 3 (using the same reference numbers for the common elements), with modifications to the inlet feeds to the combustor. FIG. 4 shows that the EGR compressor discharge at 49 can be passed through a rich or lean catalytic reactor before entering the combustor. The catalytic reactor removes certain recycle components (other than $NO_x$) to improve the combustion mixture and impart combustion stability to $CO_2$ rich flames. A "rich" catalytic reactor would include, for example, a reformer that converts a hydrocarbon fuel to a more rich hydrogen and CO mixture, thus increasing the operating flexibility of the combustor. FIG. 4 also illustrates that a liquid fuel feed to the combustor could be prevaporized in a non-oxidative environment to improve the combustion when appropriate. The compressed ambient air feed to the combustor can also be split as shown, with a portion 73 undergoing a preliminary catalytic treatment before being fed to the combustor.

Figures 5A, 5B:
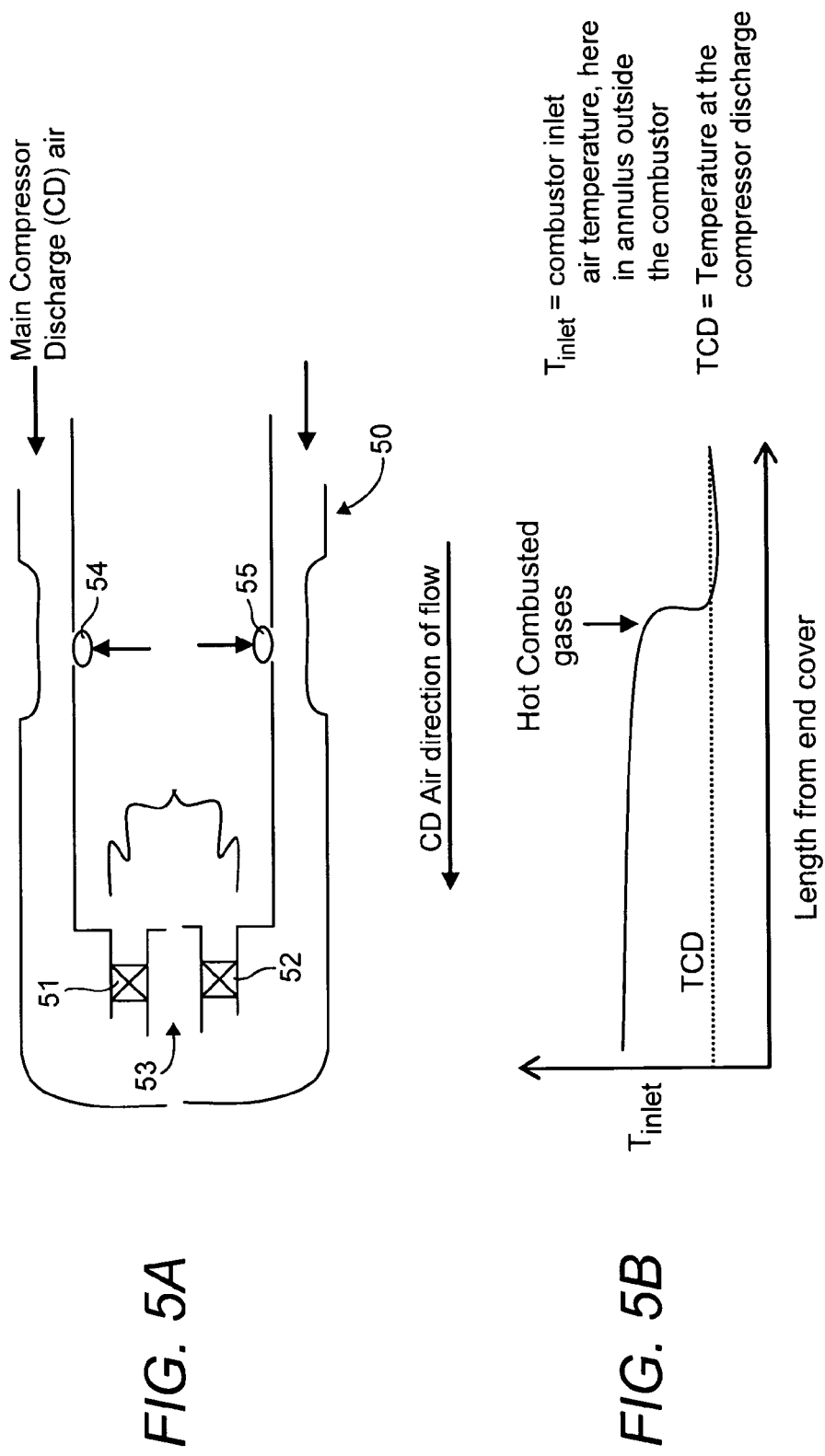
FIG. 5A is a process schematic depicting the features of an alternative embodiment of the invention using a "hot" EGR exhaust gas stream that includes a portion of the high temperature combustion gases recycled through the gas combustor to improve the overall efficiency of the system relative to the amounts of $CO_2$, CO and $NO_x$ ultimately to be treated.
FIG. 5B graphically depicts the temperature of the inlet air to the combustor, $T_{3,0}$, relative to combustor path length, together with the temperature of the compressor discharge, "TCD," which is shown for purposes of comparison with the temperature of the combustion gases along the combustor path.

Related FIGS. 5A and 5B depict the features of an alternative embodiment of the invention using a "hot" EGR exhaust gas stream comprised of a portion of high temperature combustion gases that are recycled through the gas combustor itself to improve the overall efficiency of the system relative to the amount of $CO_2$, $NO_x$ and other unwanted exhaust components that ultimately must be treated and/or removed.

FIG. 5A is a process schematic showing that a portion of "hot" EGR, i.e., before being cooled and fed to the EGR compressor, can be combined inside the combustion chamber with compressed air, separately combusted and sent directly to the gas turbine engine. Hydrocarbon fuel (shown at 51 and 52) is combined with the main compressor discharge (CD) air as shown and may have a pilot 53, with a portion recycled through ports 54 and 55 (in effect "pulled" through the ports by virtue of the lower static pressure created by the inside-out venturi configuration) and combined with a portion of the main compressor discharge air. A larger fraction of the "hot" recycle is then fed directly to the turbine.

FIG. 5B graphically depicts the temperature of the inlet air to the combustor, $T_{inlet}$, relative to combustor path length, i.e., the "length from end cover," with $T_{inlet}$ being taken in the annulus outside the combustor. The temperature at the compressor discharge, "TCD," is shown for purposes of comparison with the temperature of the combustion gases along the combustor path. The value of TCD will increase after mixing with the combustion gases. Notably, it has been found that increasing the combustor inlet air temperature while reducing the combustor path length, tends to reduce the levels of $NO_x$ and CO in the exhaust gas.

Figure 6:
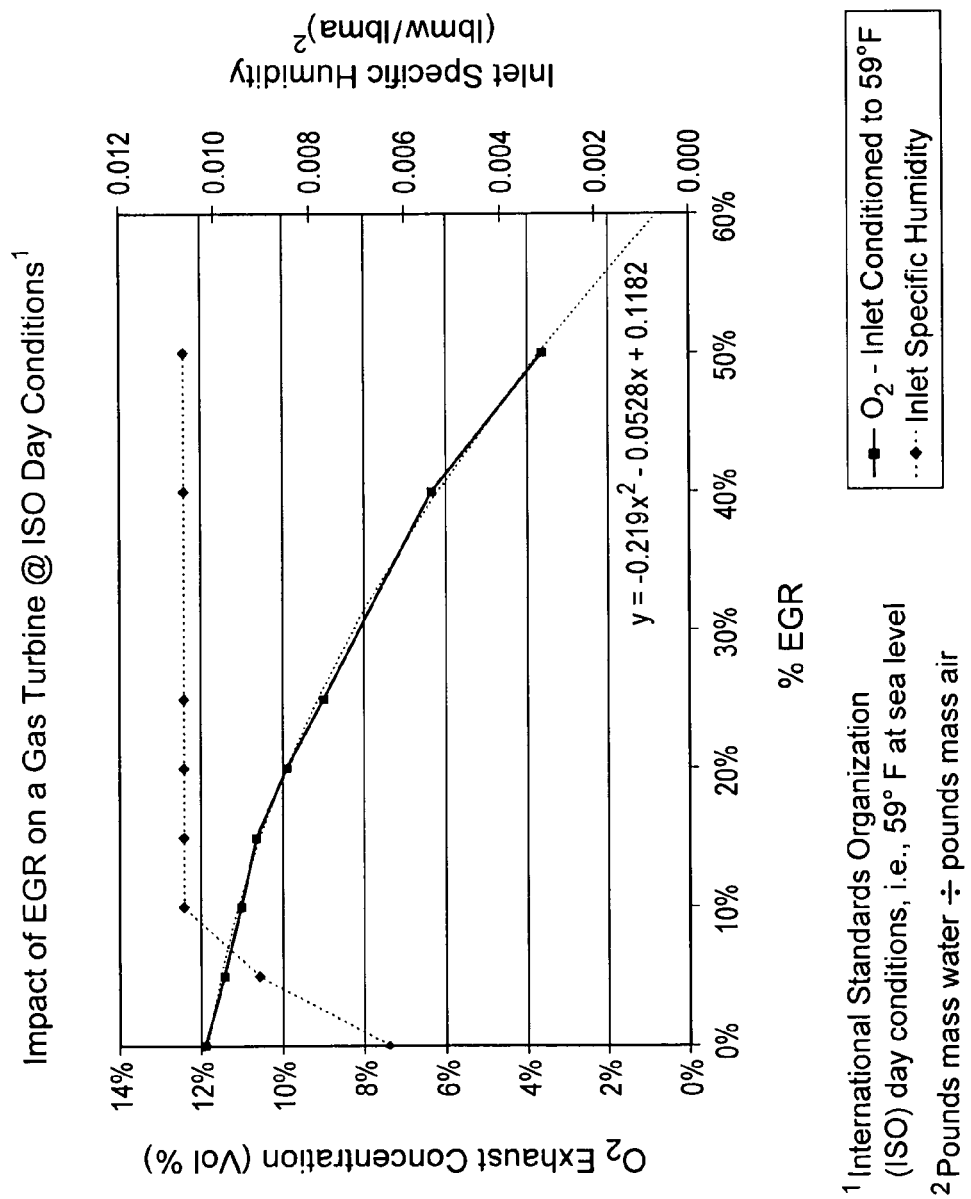
FIG. 6 is a graphical representation of the amount of oxygen remaining in the exhaust gas as a result of using varying percentages of EGR according to the invention under controlled process conditions.

FIG. 6 is a graphical representation of the amount of oxygen remaining in the exhaust gas as a result of using varying percentages of EGR according to the invention under controlled process conditions. As FIG. 6 indicates, when EGR levels above about 45% by volume are used, the oxygen level in the final exhaust gas drops down to below 4%, thereby enabling the use of a 3-way catalyst to remove the $NO_x$ components in the resulting exhaust stream. FIG. 6 also illustrates how the oxygen content of the exhaust gas drops significantly under comparable inlet specific humidity conditions from a high of about 12% down to about 1% as the percentage of EGR increases.

Figure 7:
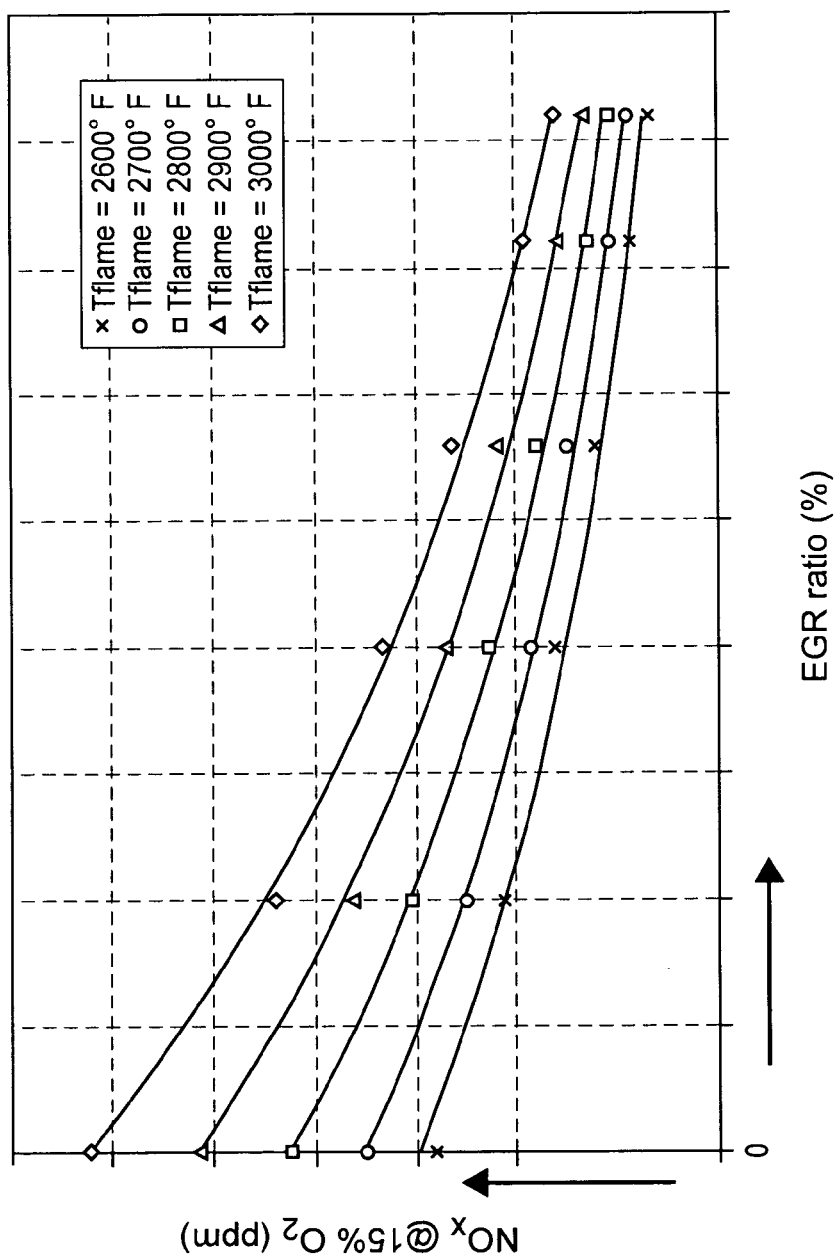
FIG. 7 is a graphical representation comparing the anticipated relative amounts of $CO_2$ and $NO_x$ produced using different percentages of EGR at varying combustor flame temperatures.

FIG. 7 is a graphical representation comparing the anticipated relative amounts of $CO_2$ and $NO_x$ produced using different percentages of EGR at varying combustor exit flame temperatures. The figure thus shows the typical effect of EGR on premixed combustor $NO_x$ emissions for a range of exit flame temperatures. FIG. 7 underscores that using a high percentage of EGR actually tends to increase the amount of $CO_2$ present in the exhaust gas to be treated, making it easier and more cost-effective to isolate and remove the $CO_2$ using conventional means. FIG. 7 also shows that the amount $NO_x$ will be reduced slightly as the flame temperature of the combustor becomes lower. Thus, in one aspect of the invention, higher process efficiencies can result from combustor flame temperatures and EGR levels that do not tend to increase the amount of $NO_x$ produced. FIG. 7 is therefore an example showing $NO_x$ dependence on flame temperature and the EGR ratio for an exemplary gas turbine combustion system. Actual, process specific, values will depend on the particular gas turbine cycle being used, the fuel type and possibly even the combustor design.

Dry 3-way conversion catalysts useful in carrying out the invention, i.e., reducing and/or eliminating the remaining $NO_x$ in the exhaust gas, are well-known in the automotive industry but have not heretofore been used (or even suggested to applicants knowledge) for use in the gas turbine art, primarily because the catalysts simply are not effective in eliminating $NO_x$ components when the oxygen content exceeds about 4% by volume. Generally speaking, 3-way catalysts are capable of stimulating the oxidation reactions for hydrocarbons and carbon monoxide (HC and CO), as well as the reduction reaction of $NO_x$.

Known 3-way catalysts useful in the invention typically contain one or more platinum group metals dispersed on a base (support) with a well-developed surface of stable oxides such as $\gamma$-$Al_2O_3$, together with oxides of Zr or Ce and one or more oxides of the alkaline-earth metals Ba, Ca and Sr. The catalyst base can be coated onto a carrier such as a ceramic block or a spirally wound metal foil of Fe—Cr—Al or corrosion-resisting materials on an iron base, or in other ways known to persons skilled in the catalyst art.

In addition to platinum group metals, 3-way catalysts that contain one or more oxides of d-elements tend to increase the efficiency of platinum group catalysts by maintaining oxygen availability through the convertible accumulation of oxygen during the cycle and by suppressing the generation of toxic gases such as $H_2S$ and $NH_3$. Other 3-way catalyst compositions known to persons skilled in the catalyst art, but heretofore not used to treat exhaust gases from gas turbine engines (for example, more recent generation platinum-based catalysts developed for use in the automotive industry), can be used to treat exhaust gases generated using the process described herein, provided such catalysts are capable of removing up to about 4% by volume $NO_x$.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A power generation system for a gas turbine engine comprising, in combination:

a first compressor having an inlet for ambient air, means for increasing the pressure of said ambient air and an outlet for compressed ambient air;

a combustor downstream of said first compressor having inlets for said compressed ambient air, compressed exhaust gases and fuel, and being capable of combusting a mixture of said fuel, said compressed exhaust gases and said compressed ambient air to generate a high temperature exhaust gas through a combustor outlet;

a turbine downstream of said combustor having an inlet coupled to the outlet of said combustor, turbine blades moveable by the force of said high temperature exhaust gas, and an outlet for partially spent exhaust gas containing about 4% or less oxygen;

a 3-way catalytic reactor downstream of said turbine having an inlet to receive and contact said partially spent exhaust gas, said 3-way catalytic reactor being capable of removing substantially all of the $NO_x$ components present in said partially spent exhaust gas;

a heat recovery steam generator (HRSG);

a second compressor for increasing the pressure of an exhaust gas recycle (EGR) stream and feeding said EGR stream to said combustor to said turbine; and an electrical generator coupled to said gas turbine engine for generating electricity.

2. A power generation system according to claim 1, further comprising cooling means for reducing the temperature of said exhaust gas to form a cooled exhaust gas recycle (EGR) stream recycled to said combustor.

3. A power generation system according to claim 2, further comprising an EGR compressor downstream of said HSRG having an inlet for said cooled EGR stream and an outlet coupled to said combustor, said compressor being capable of increasing the pressure of said cooled EGR stream.

4. A power generation system according to claim 2, further comprising a heat exchanger downstream of said HRSG capable of reducing the temperature of a select portion of said exhaust gas to form said cooled EGR stream and allow the removal of water present in said EGR before being fed back to said combustor.

5. A power generation system according to claim 2, wherein the volume of said EGR is maintained above about 35% by volume.

6. A power generation system according to claim 1, wherein the amount of $CO_2$ present in said exhaust gas is about 10-12% by volume.

7. A power generation system according to claim 1, further comprising means to recirculate a portion of the high temperature exhaust gases generated by said combustor within the combustor chamber to increase the oxidation rate after mixing said portion of gases with compressed air from said air compressor.

8. A power generation system according to claim 1, wherein said 3-way catalytic reactor uses a catalyst comprising one or more platinum group metals dispersed on a base support having a surface of stable oxides.

9. A power generation system according to claim 8, wherein said catalyst comprises $\gamma$-$Al_2O_3$ and oxides of Zr or Ce together with one or more oxides of the alkaline-earth metals Ba, Ca and Sr.

10. A power generation system according to claim 8, wherein said fuel comprises a hydrocarbon.

11. A power generation system according to claim 8, wherein said fuel comprises syngas.

12. A method for treating the $NO_x$ components present in the exhaust gases of a gas turbine engine using a 3-way catalyst by first reducing the amount of oxygen present in said exhaust gases prior to treatment with said 3-way catalyst, said method comprising:

increasing the pressure of ambient air fed to a gas compressor;

feeding compressed ambient air, compressed exhaust gases and a fuel to a gas combustor;

combusting said compressed ambient air, said compressed exhaust gases and said fuel to generate a high temperature exhaust gas stream having less than about 4% by volume oxygen;

feeding said high temperature exhaust gas to a gas turbine engine downstream of said gas combustor, said gas turbine engine being coupled to an electrical generator for generating electricity; and contacting the partially spent exhaust gas from said gas turbine generator to said 3-way catalyst positioned downstream of said gas turbine engine, said 3-way catalyst being capable of removing substantially all of the $NO_x$ components present in said partially spent exhaust gas.

13. A method according to claim 12, further comprising the step of feeding said exhaust gas following contact with said 3-way catalyst to a heat recovery steam generator.

14. A method according to claim 12, wherein said compressed exhaust gases are produced by the steps of separating a portion of said exhaust gas downstream of said heat recovery steam generator to form an exhaust gas recycle (EGR) stream, cooling said EGR stream and compressing the cooled EGR stream before feeding said cooled and compressed EGR stream to said gas combustor with said compressed ambient air and said fuel.

15. A method according to claim 12, wherein said step of contacting the partially spent exhaust gas with said 3-way catalyst uses a catalyst having one or more platinum group metals dispersed on a base support having a surface of stable oxides.

* * * * *

UNITED STATES PATENT AND TRADEMARK OFFICE
CERTIFICATE OF CORRECTION

PATENT NO. : 8,397,482 B2
APPLICATION NO. : 12/153231
DATED : March 19, 2013
INVENTOR(S) : Kraemer et al.

It is certified that error appears in the above-identified patent and that said Letters Patent is hereby corrected as shown below:

In the Specifications:

At column 1, line 3, after the title and before Field of The Invention, insert --This invention was made with Government support under Contract No. DE-FC26-05NT42643 awarded by the Department of Energy. The Government has certain rights in the invention.--

In the Claims:

In Claim 1 at column 9, line 23, delete "to said combustor to said turbine" and insert --to said combustor or to said turbine--

Signed and Sealed this
Fourth Day of June, 2013

Teresa Stanek Rea
*Acting Director of the United States Patent and Trademark Office*